Jan. 5, 1937.  D. MAPES  2,067,065
DISPENSING DEVICE
Filed July 14, 1934  4 Sheets-Sheet 2

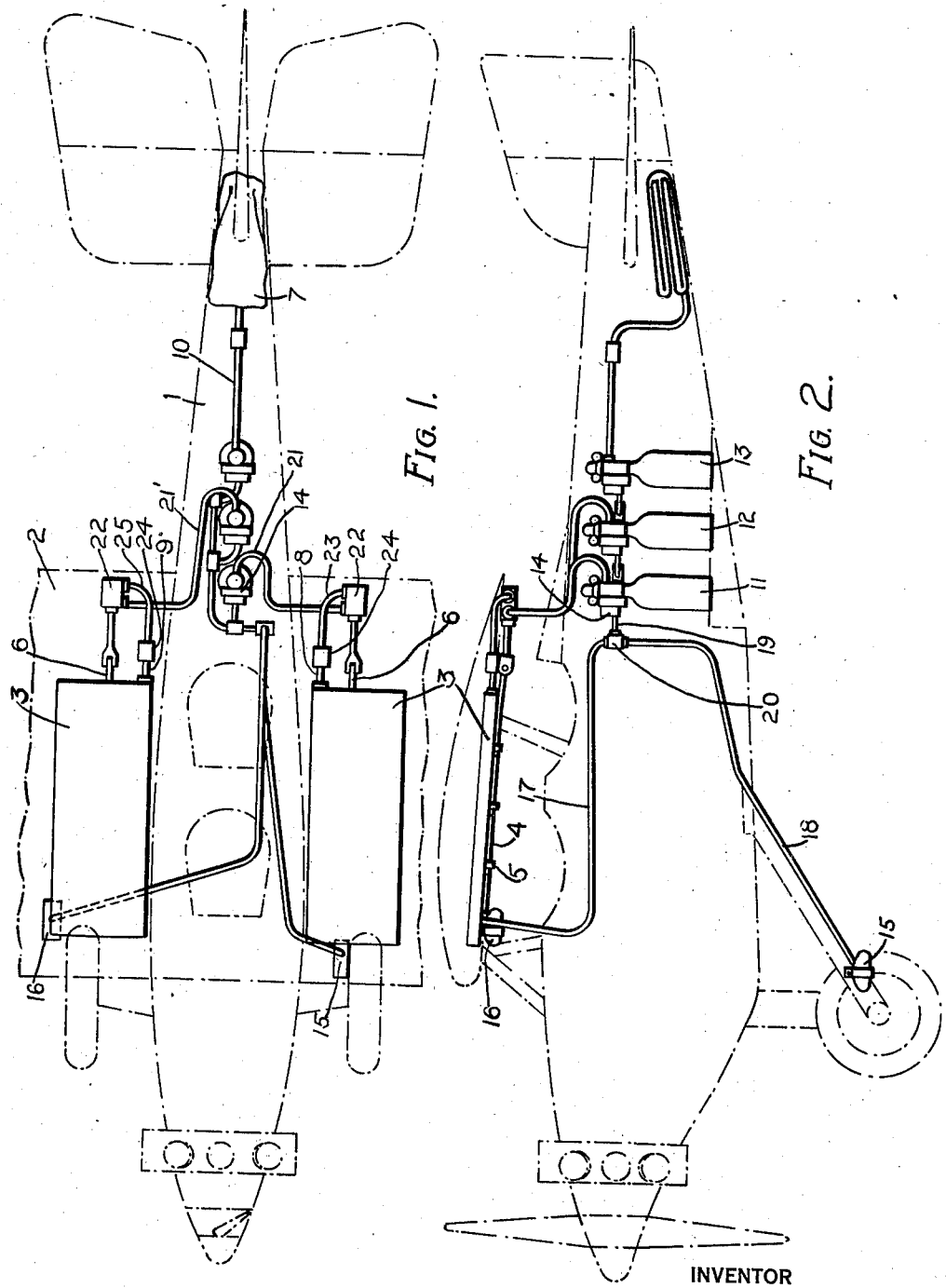

INVENTOR
DANIEL MAPES
BY
J. William Carson
ATTORNEY

Jan. 5, 1937.   D. MAPES   2,067,065
DISPENSING DEVICE
Filed July 14, 1934   4 Sheets-Sheet 3

INVENTOR
DANIEL MAPES
BY
J. William Carson
ATTORNEY

Jan. 5, 1937.  D. MAPES  2,067,065
DISPENSING DEVICE
Filed July 14, 1934  4 Sheets-Sheet 4
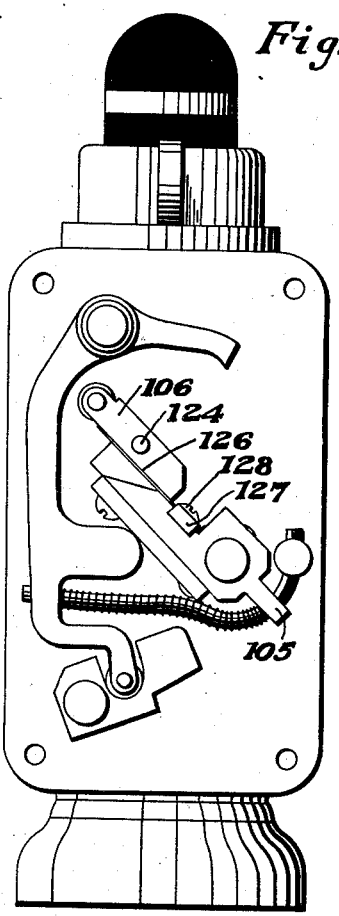
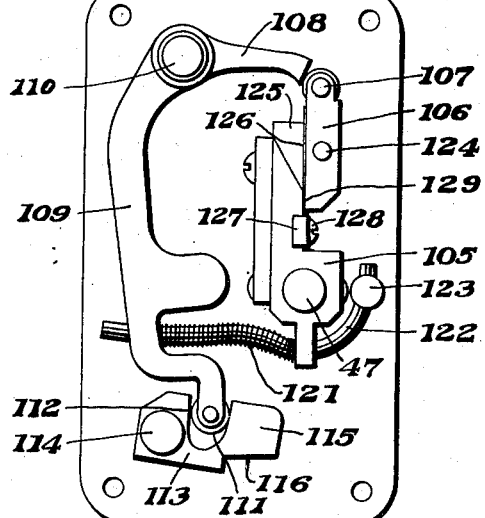
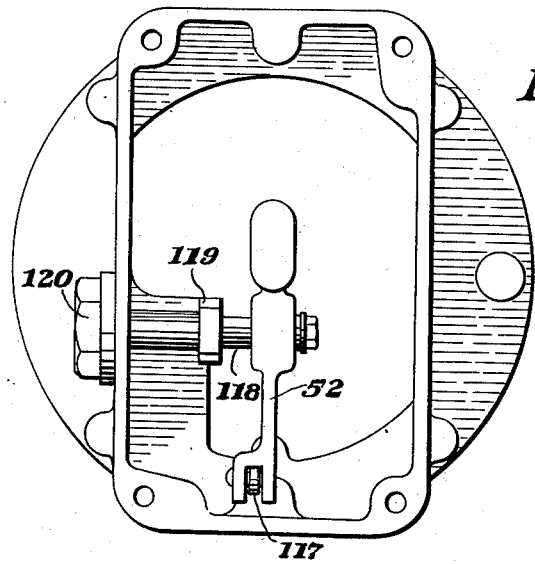
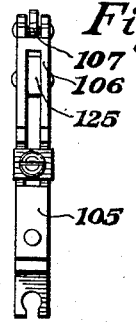
INVENTOR
*Daniel Mapes*
BY
*J. William Carson*
ATTORNEY Patented Jan. 5, 1937

2,067,065

UNITED STATES PATENT OFFICE 2,067,065

DISPENSING DEVICE

Daniel Mapes, Upper Montclair, N. J., assignor to Walter Kidde & Company, Inc., Bloomfield, N. J., a corporation of New York Application July 14, 1934, Serial No. 735,149

4 Claims. (Cl. 221—73.5)

The present invention relates to flotation gear for aircraft of the type comprising an arrangement wherein inflatable bags are provided on the aircraft and are adapted to be inflated with a buoyant fluid or gas when the aircraft descends upon a body of water. When inflated, the bags form buoyant floats for supporting the aircraft and prevent it from sinking.

In connection with aircraft flotation equipment of this nature, it is important that the inflation of the bags should take place immediately on the contact of the aircraft with the water, and it is also highly important that the buoyant fluid should not be released prior to the alighting of the aircraft upon the water, since the great resistance offered by the inflated bags to the travel of the aircraft through the air would be dangerous.

To eliminate, as far as possible, the personal equation as a factor in the operation of equipment of this nature, the present invention has been designed and provides a structure wherein the supply of buoyant fluid is automatically released to inflate the inflatable bags upon contact of the aircraft with any body of water on which it should happen to alight.

While the present invention incorporates certain features of the apparatus shown and described in my copending application Serial No. 515,717, filed February 14, 1931, it differs therefrom in the provision of means for automatically releasing the buoyant fluid from its container or containers by simple and effective means automatically operable by the completion of an electric circuit when the aircraft descends upon a body of water.

In apparatus of this character for use on aircraft it is desirable that the weight of the apparatus be as light as possible, and that the initial operating force be as small as possible; and it is therefore an object of the present invention to provide an aircraft flotation gear which is both light and compact, and in which the initially required operating force is small in comparison with the actual force necessary to release the buoyant fluid from its container or containers. In connection with the carrying out of the last named object, an important feature of the present invention is the provision of a series of interengaging levers for successively reducing the force required to restrain the release of the fluid medium, the initially required operating force being only a small fraction of the actually required releasing force.

Another object of the invention is to provide an aircraft flotation system wherein the supply of buoyant fluid is automatically released from a plurality of containers thereof to inflate the inflatable bags upon contact of the aircraft with any body of water upon which it should alight.

A further object of the invention is to provide a system of the above character which functions automatically upon initial contact of the aircraft with water regardless of whether the aircraft alights upon the water in an upright or in an inverted position.

It is another object of the invention to provide a fluid release mechanism of the above character, wherein the elements of the releasing device are so designed as to be capable of manual resetting without difficulty and further to be insensitive to jars or other disturbing stresses while being highly sensitive to a predetermined actuating force.

A further object of the invention is to provide a mechanism which effectively prevents accidental inflation of the equipment upon accidental discharge of the buoyant fluid due to dangerous increases in temperature and pressure of the inflating medium stored in the containers.

A further object of the invention is to provide a system for releasing pressure fluid in a plurality of containers in which the accidental discharge of fluid from one or more containers due to dangerous increases in temperature and pressure of the contained fluid will not cause operation of the remaining containers with attendant loss of the fluid supply.

In the preferred embodiment of the invention the buoyant fluid or gas is contained in a pressure container sealed by a frangible disc adapted to be pierced by a normally energized puncturing member normally held in restraint by a series of interengaging levers designed to successively reduce the force required to restrain the release of the fluid medium, the force required to initiate the releasing operation being naturally correspondingly reduced; the last lever of said series of levers being arranged to be tripped by an element controlled by an electro-magnet which is energized by the closing of an electrical circuit by a float controlled switch when the aircraft descends upon a body of water.

Further objects, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 7 is a view in elevation, showing the lever chamber with the cover thereof removed.

Figure 8 is a view in elevation, showing the cover of the lever chamber with the mechanism carried thereby.

Figure 9 is a detail view similar to Figure 7, showing the position which the tripping mechanism assumes upon release thereof.

Figure 10 is a detail view in elevation of one of the levers.

Figures 3, 6:
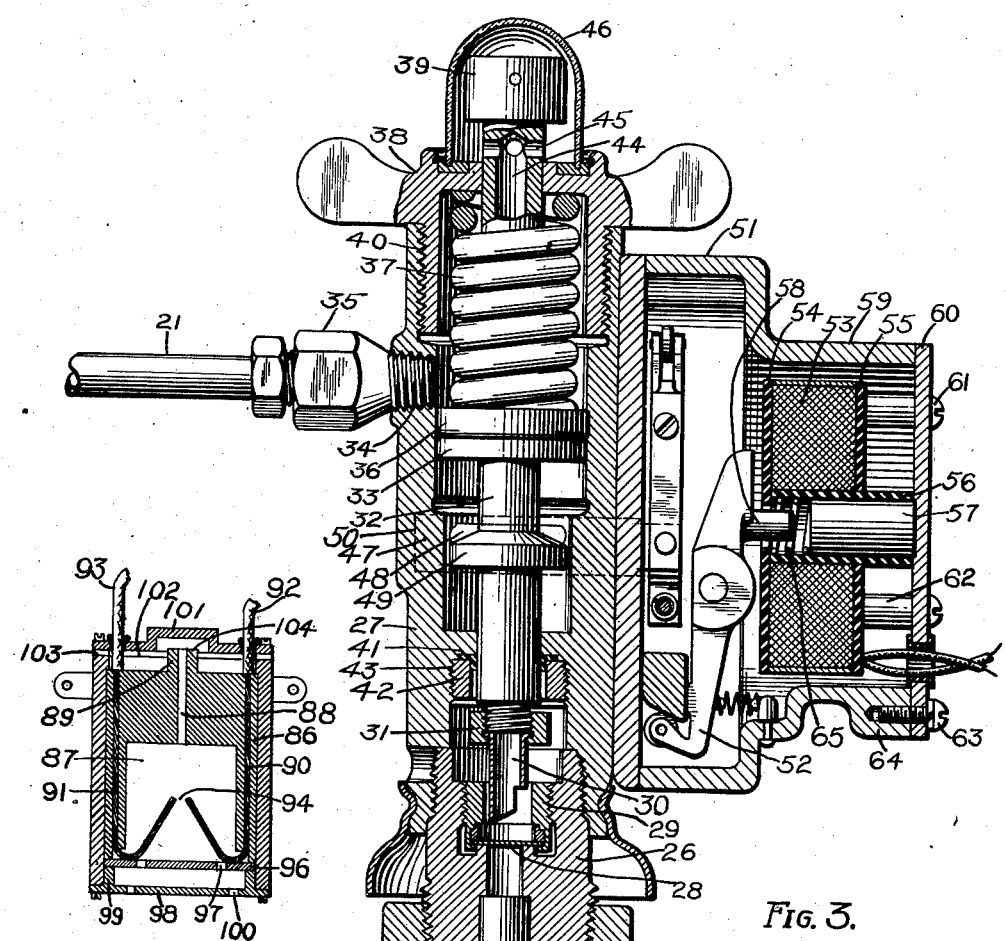
Figure 3 is a view in transverse section showing a fluid releasing mechanism constructed in accordance with the present invention.
Figure 6 is an enlarged view, in cross-section, of another type of electrical actuator in accordance with the present invention.

Referring to Figures 1 and 2 of the above drawings, an aeroplane fuselage is indicated at 1, and the wing of the aeroplane at 2. On the underneath side of the wing and within the stream line of the wing are set flotation bag containers 3, each containing a normally deflated flotation bag retained within the container by means of wires 4 which pass through ringlets 5 to maintain the cover of each container closed. In order that the flotation bags may be secured effectively to the plane, rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. Another flotation bag 7, normally deflated, is provided within the aft compartment of the fuselage, but this bag need not be stored in a container, as it is in an out-of-the-way location and as it is already within the stream lines of the plane. For the purpose of expanding the flotation bags, conduits 8, 9 and 10 are connected to the respective bags, the conduits being respectively connected to the pressure medium containers 11, 12 and 13.

Each of the pressure medium containers 11, 12 and 13 is provided with a releasing mechanism 14, described in detail hereinafter, the releasing mechanism of the first container 11 being actuated by electrical means controlled by an electrical circuit which is normally open, but which is closed upon immersion in water of one of the electrical actuator members 15 or 16, the circuit wires from the actuators being run through the tubes 17 and 18 to the electrical conduit 19 through an electrical junction box 20, the electrical circuit including a source of electrical potential (not shown) and an electrical element of the releasing mechanism 14. The releasing mechanisms of the pressure medium containers 12 and 13 are connected in parallel circuit arrangement with the releasing mechanism 14 of the container 11, the releasing mechanisms of the several containers being thereby actuated simultaneously.

Upon release of the medium within the pressure medium container 11, it passes through a discharge line 21 into one end of a piston bag release 22, driving the piston toward the right, as viewed in Figures 1 and 2, and disengaging the wires 4 from the ringlets 5. When the piston in the piston bag release 22 reaches the end of its stroke, the medium escapes through a conduit 23, a check valve 24 and the conduit 8 into the flotation bag, thus causing it to expand in accordance with the pressure of the medium. During the inflation of the bag the cover of the container 3, containing such bag, lifts so as to permit the free inflation of the bag. By providing a check valve as indicated at 24 the medium which has expanded into the flotation bag is prevented from escaping therefrom, continued passage of the medium into the bag being freely permitted. The flotation bag contained in the other container 3 is similarly inflated from the pressure medium container 12, the pressure medium being discharged into the flotation bag through the discharge line 21', another piston bag release 22, the conduit 25, another check valve 24, and the conduit 9. The flotation bag 7 is inflated directly through the conduit 10, no piston bag release being necessary, but only a check valve 24.

Referring now to Figure 3 of the drawings, a container 11 is provided, within which a supply of a medium under pressure is maintained by means of a closure body 26 and a bonnet 27. The closure body 26 is threaded into the top of the container 11 and is provided with a frangible disc 28 secured in position by a nut 29. A cutter 30 is movable within the nut 29, the cutter being mounted by means of a nut 31 on a hollow cutter stem 32. The cutter stem 32 is formed with a flange 33 having a close-working fit on its circumferential surface within the bore of the bonnet 27. An outlet 34 is provided in the bonnet for receiving a fitting 35 which is adapted to be connected to a discharge line 21. The flange 33 on the cutter stem is preferably disposed so as to be nearer the container 11 than the outlet 34, as described in further detail hereinafter.

Before the cutter stem 32 is assembed in the bonnet 27, a cup leather 36 is passed over the upper portion of the stem and seated by a spring 37, which provides the actuating force for moving the cutter and the cutter stem toward the container. The spring 37 is seated against a nut 38, which is a combined sealing and resetting nut, a stop 39 being provided on the upper end of the stem to limit the movement of the stem toward the container. The stop 39 also serves as an indicator, in a manner which will be hereinafter described.

The above described cutter assembly is inserted in the bonnet 27 and the combined sealing and resetting nut 38 is run into position by means of threads 40 on the bonnet and the nut.

Before the bonnet 27 is coupled to the closure body 26, a leather washer 41 is passed over the end of the cutter stem and secured in position by means of a nut 42 having threads 43 which engage co-operating threads on the bonnet 27. The cutter 30 is then secured to the lower end of the cutter stem 32 by means of the already referred to nut 31.

In the above described mechanism, the hollow cutter 30 communicates with the hollow portion 44 of the cutter stem, which hollow portion communicates with the atmosphere by means of openings 45 formed in the upper end of the cutter stem. The normal position of the cutter stem is as indicated in Figure 3, the stem being shown in its upper position, the cutter 30 lying some distance above the frangible disc 28, and the openings 45 communicating with the spaces beneath the fracturable cap 46. When, therefore, the pressure medium is released from the container when the frangible disc 28 ruptures due to an excessive pressure of the medium within the container 11, the pressure medium will be discharged into the atmosphere through the cutter 30, the hollow portion 44 of the cutter stem 32, and the openings 45, the pressure of the escaping medium being sufficient to rupture the fracturable cap 46, thus permitting the escape of the pressure medium to the atmosphere.

Extending within the bonnet 27 is a spindle 47 which is formed with a groove 48 for engaging a flange 49 on the cutter stem 32. The spindle 47 is pivoted in the bonnet at 50 and extends exteriorly thereof within a lever chamber 51, this lever chamber being suitably secured to the bonnet.

The foregoing description relates to the disc rupturing mechanism and means for discharging the contents of a pressure medium container into a discharge line or, in the event that the discharge is accidental, into the atmosphere without possibility of any of the medium entering the discharge line. The means for releasing the foregoing mechanism will now be described and, in this connection, it will be observed that spindle 47 extends within the lever chamber 51 and has secured to the end thereof a two-part lever 105—106, which for the purpose of the discussion at this point may be considered as a rigid lever. A contact roller 107 is rotatably mounted on the upper end of lever 105—106 and is adapted to engage a cooperating contact surface on one arm 108 of a bell crank lever having a depending arm 109. Stud 110 pivots the bell crank lever within the chamber 51 and a contact roller 111 is rotatably mounted on the lower extremity of the depending arm 109. This last named contact roller is adapted to be engaged by a cooperating surface within a recess 112 of a lever 113 pivoted upon a stud 114. The lever 112 is further provided with an extension 115 upon the lower portion of which a camming surface 116 is formed sloping rearwardly and upwardly from the lower edge of the extension, as viewed in Figure 7.

To normally restrain the lever 113 from disengaging arm 109, a catch is provided in the form of a contact roller 117 which engages the camming surface 116. The contact roller 117 is carried by the tripping lever 52 which is pivotally mounted intermediate its ends on a stud 118 secured in a boss 119 carried by the cover of the lever chamber. The stud 118 bears on its opposite end within a bushing 120 secured within a wall of the lever chamber, the bushing 120 serving to secure the stud with respect to the boss 119 by holding a shoulder on the stud against the boss. The contact roller 117 of the tripping lever is normally urged into engagement with the surface 116 of the lever 113 by means of a spring bearing against the lower end of the tripping lever, as shown in Figure 3.

It will be noted that the force of the spring 37 tends to turn the spindle 47 in a counterclockwise direction, as viewed in Figure 7; and that consequently the bell crank lever 108—109 tends to move likewise in a counterclockwise direction, while the lever 113 tends to move in a clockwise direction.

A spring 121, the purpose of which will be described further on, tends to move the levers 105—106 and 108—109 away from each other at their lower extremities. This spring is guided on a rigid curved guide member 122 which is secured firmly at one end within a fixed stud 123 and which passes through openings in the levers 105—106 and 108—109.

It will be noted that the accidental tripping of the lever 52 as by vibrations, etc., is resisted by the inclination of the camming surface 116 in such a fashion that the lever system must be slightly moved in a direction opposite from its tripping movement before the tripping lever can be disengaged from the surface 116. This movement is, of course, against the force of the spring 37 and serves as a positive deterrent to the accidental tripping of the mechanism.

To effect the releasing movement of the tripping lever 52, an extension 58 is formed on the tripping lever, which is adapted to be forcibly engaged in a manner to be hereinafter described and to thereby rotate the tripping lever in a counterclockwise direction, as viewed in Figure 3. This moves the contact roller 117 from under the surface 116 and permits the lever 113 to rotate in a clockwise direction, as viewed in Figure 7, under the superior transmitted force of the spring 37. This permits the bell crank lever 108—109 to rotate in a counterclockwise direction and to thus disengage the contact roller 107 on the spindle 47, permitting the latter to turn under the force exerted by the spring 37 to disengage the groove 48 from the flange 49. Such disengagement permits the cutter 30 to be advanced into the disc 28 and effects the rupturing thereof, thus causing the discharged medium to flow into the discharge line 21, the stop 39 engaging the upper surface of the combined sealing and resetting nut 38, thus serving to limit the downward movement of the cutter 30. Of course, when the stop 39 engages the upper surface of the nut 38, the openings 45 recede within the chambered portion of the nut 38, thus establishing a path for the flow of the pressure medium through the ruptured frangible disc, the hollow cutter 30, the passage 44 in the cutter stem 32, the openings 45, and the chambered portions of the nut 38 and the bonnet 27 to the outlet 34 and thence to the discharge line 21.

In accordance with the present invention, the stop 39 in conjunction with the fracturable cap 46 serves as an indication that the release mechanism has been operated. In order to render the indicating means more effective in its indication, a suitable inscription such as "Set" may be made on the circumference of the stop 39, and the fracturable cap 46 may be rendered opaque, however, leaving a transparent circumferential band on the cap so positioned that the inscription "Set" will normally show through the transparent band when the cutter stem 32 is in its uppermost position as shown in Figure 3. As soon, however, as the releasing mechanism has been actuated, the inscription "Set" will disappear behind the lower opaque portion of the cap 46, thus serving to indicate that the apparatus is not "set", but has been released. Of course, when the pressure medium is released from the container by the rupturing of the frangible disc 28 due to the development of an excessive pressure within the container, the fracturable cap 46 is fractured as already described hereinabove, and the fracturing of the cap serves as an indication, not only that the container 11 is empty, but that the container has been discharged by reason of the development of an excessive pressure therein.

The manner in which the lever 52 is actuated will now be described. This actuation is effected by an electro-magnet comprising an electro-magnetic coil 53 having end pieces 54 and 55 of insulating material, and a liner or sleeve 56, also of insulating material. Within the sleeve 56 is arranged a magnetic core 57, which is adapted to forcibly engage the extension 58 on the lever 52 when the electro-magnet is energized, causing it to disengage the lever system and permitting the releasing mechanism to be actuated in the manner already described. The electro-magnet is mounted within an extension 59 of the lever chamber 51, the electro-magnet being secured to, but spaced from the cover 60 by means of screws 61 passing through the cover and through spacer bushings 62 and engaging the end pieces 55 of the electro-magnet. The cover 60 is supported on the extension 59 by means of screws 63 inserted into supporting lugs 64 on the extension 59. In order to prevent the release of the mechanism due to jarring or due to any other undesirable force which would cause the magnetic core 57 to engage the extension 58 on the lever 52, the magnetic core 57 is normally maintained out of contact with the extension 58 by means of a coiled spring 65 engaging the magnetic core on one end and a shoulder formed by the end piece 54 of the electro-magnet on the other end, the spring being of sufficient strength to resist any undesirable force tending to release the mechanism, but being yielding under the force developed upon energization of the electro-magnet, it being understood that energization of the electro-magnet will cause the magnetic core to be drawn within the magnet with considerable force.

Figure 4:
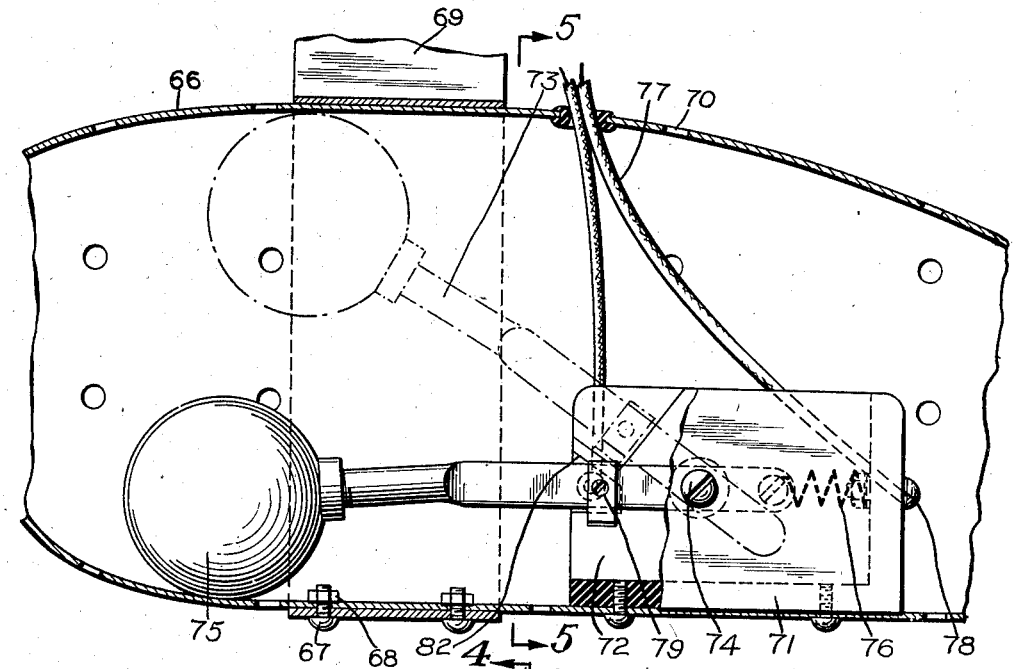
Figure 4 is an enlarged view, partly in section, of an electrical actuator in accordance with the invention.
Figure 5:
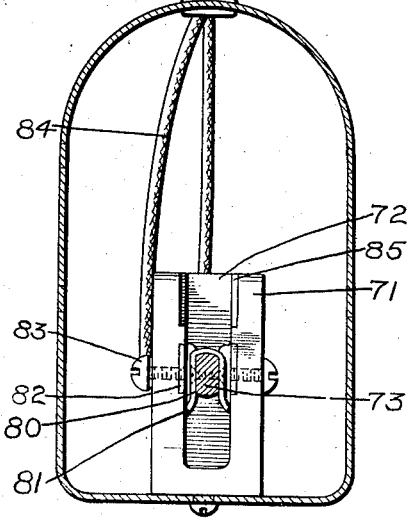
Figure 5 is a view taken on the line 5—5 of Figure 4 and looking in the direction of the arrows.

The preferred construction of the electrical actuators 15 and 16 will now be described in detail in connection with Figures 4 and 5, in which 66 represents a streamline receptacle having secured thereto by means of screws 67 and nut 68, an encompassing strap 69 serving to secure the receptacle 66 in any desired position. The receptacle 66 is provided with numerous openings 70 to permit entry of water upon the immersion of the receptacle in water, so as to actuate the circuit closing mechanism contained within the receptacle. This circuit closing mechanism comprises a mounting block 71 of insulating material, the mounting block being chambered at 72 in order to receive the operating lever 73, which is pivoted on the mounting block by means of a pivoting screw 74. On one end of the lever 73 is arranged a ball float 75, while the other end of the lever is connected by means of a relatively stiff electrically conductive spring 76 to an electrical conductor 77, which latter is secured to a screw 78 passing through the end of the mounting block 71 and engaging the one end of the spring 76; the spring serving not only to render the lever electrically active, but also to prevent movement of the lever due to jarring, thereby preventing undesirable closing of the electrical circuit referred to at various points in the above description. Of course, the spring 76 is not made stiff enough to resist the rotation of the lever when the ball float 75 is immersed in water.

Mounted on the lever 73, by means of screws 79 is a spring contact element 80, the ends 81 of which are arranged to press against the side walls of the chambered portion of the mounting block 71 and to engage metallic plates 82 inserted within but lying flush with the side walls of the chamber of the mounting block. One of these metallic plates is electrically connected, by means of a screw 83, to an electrical conductor 84.

With this construction, when the receptacle 66 is immersed in water, the water enters the receptacle through the openings 70, causing the ball float 75 to rise and to carry with it the lever 73, whereby the ends 81 of the spring contact 80 carried by the lever 73 engage the metallic plates 82, thus causing an electrical circuit to be completed from the electrical conductor 77, thru the screw 78, the spring 76, the lever 73, the spring contact 80, and that one of the metallic plates 82 which is electrically connected by means of the screw 83 to the electrical conductor 84; so that by this construction there is provided a simple and effective means for closing an electrical circuit upon the immersion of actuator in water.

In view of the fact that the electrical circuit need only be closed momentarily, and in order to reopen the circuit after it has accomplished its useful purpose, recesses 85 are arranged in the side walls of the chambered portion of the mounting block 71 within the path of movement of the spring contact 80, so that upon a continued rise of the ball float 75, the ends 81 of the spring contact 80 will spring outwardly into the recesses 85, thus preventing the lever 73 from returning to its normal position and thus closing the circuit again during its return movement. Of course, the lever 73 may be returned to its normal position when desired by compressing the ends 81 of the spring contact 80.

Referring now to Figure 6, in which is shown another type of electrical actuator which may be used in connection with the present invention, the reference numeral 86 represents an insulating member chambered at 87 and having a passage 88 for establishing communication between the chamber and the exterior thereof, the upper end of the passage terminating in a raised portion 89 of the insulating member 86. The insulating member 86 is also provided with passages to receive uninsulated portions 90 and 91 of electrical conductors 92 and 93, the extremities of the uninsulated portions 90 and 91 being introduced within the chamber 87 in a closely spaced relationship with each other, but leaving a gap 94 which will pass sufficient current to actuate an electrical device upon immersion of the gap 94 in water. The insulating member 86 is contained within an outer casing 95, one end of which is closed by a disc 96 of insulating material, having openings 97 for admitting water to the chamber 87. The insulating disc 96 is held in position by means of a cover 98 provided with a rim portion 99 serving to space the insulating disc 96 from the cover. The cover 98 is provided with openings 100, which are arranged out of alinement with the openings 97 in the insulating disc 96, the arrangement being such as to resist the entry of rain within the chamber 87 but to permit the entry of water into the chamber upon the immersion of the actuator in water. A similar arrangement for resisting entry of rain within the chamber 87 is provided at the upper end of the actuator, said arrangement comprising a cover 101 supported on the outer casing 95 on a rim portion 102 having passages 103 which enter the actuator at a level below the upper surface 104 of the raised portion 89 of the insulating member 86; this arrangement serving to resist the entry of rain within the chamber 87 through the passage 88 but permitting the entry of water upon the immersion of the actuator in water.

The manner of operation of the actuator shown in Figure 6 is very simple, the immersion of the actuator in water serving to form an electrically conductive path across the gap 94 between the uninsulated ends of the electrical conductors 92 and 93, which electrical conductors are connected in circuit with a source of electrical potential and the electrical device to be operated.

To reset the cutter stem and its lever system after the apparatus has been operated, cooperating cam and stop surfaces on the several levers and a special construction of the lever 105—106 are employed to facilitate such operation.

In this connection it should first of all be noted that Figure 9 illustrates the tripping mechanism in its released position. It has already been explained that the initial movement of the lever 113 is in a clockwise direction under the superior transmitted force of the spring 37. This is then followed by a movement of said lever in a counterclockwise direction under the force of the spring 121, which latter tends to rotate the bell crank lever 108—109 in a clockwise direction and the lever 105—106 in a counterclockwise direction, the movement of the bell crank lever carrying with it the lever 113, and resulting in the condition shown in Figure 9. In this condition the bell crank lever and the lever 113 are in substantially their initial positions, but the lever 105—106 is not. It will of course be understood that with the various levers in the positions shown in Figure 9, the tripping lever will also have returned to its set position under the influence of its locking spring. In order that the lever 105—106 may be reset, a special two-part lever construction is employed, the part 106 being pivoted at 124 on a tongue 125 formed on the part 105, the part 106 being forked to span the tongue 125, as is better shown in Figure 10. A thin spring member 126, which is forked at its upper end where it lies opposite the forked portions of the part 106, is secured at its lower end to the part 105 by a clip 127 and screw 128. By reason of this construction of the lever 105—106, the part 106 can be forcibly rotated on its pivot 124 in a counterclockwise direction with respect to the part 105 against the yielding resistance of the spring member 126, but as soon as the rotating force is removed, the part 106 will return to its normal position with respect to the part 105 under the influence of the spring member 126. It will of course be appreciated that when the parts 105 and 106 are in their normal position, they act as a rigid lever so far as any clockwise movement of the part 106 with respect to the part 105 is concerned, as the two parts abut each other at the point of contact 129.

As has already been explained, the groove 48 in the spindle 47 normally restrains the downward movement of the cutter stem. The lower face of this groove exerts this restraining effect upon the stem, and upon upward movement of the spindle, the flange 49 on the stem engages the upper surface of the groove to rotate the spindle in a clockwise direction, as viewed in Figure 9. Further movement of the cutter stem and the spindle causes the contact roller 107 of the lever 105—106 to forcibly engage the arm 108 of the bell crank lever 108—109, causing the part 106 to rotate in a counterclockwise direction with respect to the part 105, whereby the part 106 is enabled to pass beyond the cam surface on the end of the arm 108, the part 106 snapping into its normal position with respect to the part 105 under the influence of the spring member 126 after the contact roller 107 has cleared the end of the arm 108 of the bell crank lever. Upon still further movement of the cutter stem, the spring 37 is compressed to its set position and the various levers assume their original positions, as shown in Figure 7, under the transmitted force of the spring 37. The lever system and the pressure medium releasing mechanism are now entirely reset.

It will of course be readily apparent that the present invention is adaptable for other purposes than in connection with aircraft flotation gear.

From the foregoing description it will be seen that I have provided simple and effective means for releasing pressure fluid from one or more containers thereof, where only a small initial operating force is available, and it will be further seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. A release device for fluids under pressure having a frangible disc to confine a medium under pressure, a body member provided with an outlet, a cutter stem movable in the body member a cutter on the stem to rupture the disc, a spring to urge the cutter normally toward the disc, a spindle rotatably mounted in the body member, a catch on the cutter stem engaging the spindle, means to prevent movement of the spindle, said means comprising a series of normally engaged levers mounted on the body member and adapted to move into disengagement when the levers are released, the outermost lever of said series being secured to said spindle, tripping means for holding the innermost lever of the series against the transmitted force of the spring normally urging the cutter toward the disc, an electro-magnetic coil mounted adjacent said tripping means, and an element controlled by said coil and arranged to trip said tripping means upon energization of the coil, whereby the cutter is released to rupture the disc to release the pressure medium.

2. A release device for fluids under pressure having a frangible disc to confine a medium under pressure, a body member provided with an outlet, a cutter stem movable in the body member a cutter on the stem to rupture the disc, a spring to urge the cutter normally toward the disc, a spindle rotatably mounted in the body member, a catch on the cutter stem engaging the spindle, means to prevent movement of the spindle, said means comprising a series of normally engaged levers mounted on the body member and adapted to move into disengagement when the levers are released, the outermost lever of said series being secured to said spindle, tripping means for holding the innermost lever of the series against the transmitted force of the spring normally urging the cutter toward the disc, an electro-magnetic coil mounted adjacent said tripping means, a movable magnetic core controlled by said coil and arranged to engage said tripping means to trip it upon energization of the coil, and yieldable means normally preventing engagement of the magnetic core with the tripping means, whereby upon energization of the coil the cutter is released to rupture the disc to release the pressure medium.

3. A release device for fluids under pressure having a frangible disc to confine a medium under pressure, a body member provided with an outlet, a cutter stem movable in the body member, a cutter on the stem to rupture the disc, a spring to urge the cutter normally toward the disc, a spindle rotatably mounted in the body member, a catch on the cutter stem engaging the spindle, means to prevent movement of the spindle, said means comprising a series of normally engaged levers mounted on the body member and adapted to move into disengagement when the levers are released, the outermost lever of said series being secured to said spindle, tripping means for holding the innermost lever of the series against the transmitted force of the spring normally urging the cutter toward the disc, and electro-magnetically operated means to trip said tripping means.

4. A releasing device comprising a series of normally engaged levers adapted to move into disengagement when the device is released, the outermost lever of said series including a rotatable spindle adapted to engage restrainingly means to be released and having a spindle arm adapted to be engaged by an operatively adjacent lever of the series, tripping means for holding the innermost lever of the series against the transmitted pull of the means to be released, and cooperating cam and stop surfaces on successive levers of said series through which the lever system may be reset by the restoration of the outermost lever to its restraining position; said spindle arm comprising two portions pivotally mounted with respect to each other and having a normally extended position and a collapsed position, cooperating stop surfaces on the two portions of said spindle arm adapted to give to the spindle arm the effect of a rigid one-piece arm when the spindle arm is subjected to a force tending to move it in a direction opposite to its releasing direction, and yielding means normally tending to maintain the portions of the spindle arm in their extended relationship and to return them to the extended position when they are moved to their collapsed position, whereby the spindle arm may be reset by a collapsing movement of the portions thereof after the other levers of the series of levers have been restored to their set position.

DANIEL MAPES.